(12) United States Patent
Blasco-Allue et al.

(10) Patent No.: US 9,367,471 B2
(45) Date of Patent: Jun. 14, 2016

(54) FETCH WIDTH PREDICTOR

(75) Inventors: Conrado Blasco-Allue, Sunnyvale, CA (US); Ramesh B. Gunna, San Jose, CA (US)

(73) Assignee: Apple Inc., Cupertino, CA (US)

( * ) Notice: Subject to any disclaimer, the term of this patent is extended or adjusted under 35 U.S.C. 154(b) by 863 days.

(21) Appl. No.: 13/609,236

(22) Filed: Sep. 10, 2012

(65) Prior Publication Data

US 2014/0075156 A1    Mar. 13, 2014

(51) Int. Cl.
G06F 9/38 (2006.01)
G06F 12/08 (2016.01)
G06F 9/00 (2006.01)

(52) U.S. Cl.
CPC .......... *G06F 12/0886* (2013.01); *G06F 9/3802* (2013.01); *G06F 9/3804* (2013.01); *G06F 2212/452* (2013.01); *Y02B 60/1225* (2013.01)

(58) Field of Classification Search
None
See application file for complete search history.

(56) References Cited

U.S. PATENT DOCUMENTS

| | | |
|---|---|---|
| 5,210,842 A | 5/1993 | Sood |
| 6,125,441 A | 9/2000 | Green |
| 6,938,126 B2 | 8/2005 | Ramirez et al. |
| 7,657,726 B2 | 2/2010 | Emma et al. |
| 7,886,134 B2 | 2/2011 | Mizumo |
| 2003/0196044 A1 | 10/2003 | Ramirez et al. |
| 2011/0238953 A1* | 9/2011 | Metsugi ............... G06F 9/30101 712/207 |

FOREIGN PATENT DOCUMENTS

TW    200723281    6/2007

OTHER PUBLICATIONS

International Search Report and Written Opinion in Application No. PCT/US2013/058750 dated Jan. 3, 2014, 9 pages.
Juan L. Aragon, et al., "Energy-Effective Instruction Fetch Unit for Wide Issue Processors," Advances in Computer Systems Architecture Lecture Notes in Computer Science, Jan. 1, 2005, XP019022372, pp. 15-27.
Office Action and Search Report in Taiwanese Application No. 102132631 mailed Jan. 15, 2015, 7 pages.

* cited by examiner

*Primary Examiner* — Scott Sun
(74) *Attorney, Agent, or Firm* — Meyertons, Hood, Kivlin, Kowert & Goetzel, P.C.

(57) ABSTRACT

Various techniques for predicting instruction fetch widths. In one embodiment, a fetch prediction unit in a processor is configured to generate a fetch width that specifies a number of bits to be retrieved in a subsequent fetch from an instruction cache. The fetch prediction unit may also generate a fetch prediction that includes the fetch width in response to a current fetch request. A number of bits corresponding to the fetch width may be fetched from the instruction cache. The fetch width may correspond to a location of a predicted-taken control transfer instruction. This fetch width prediction may lead to power savings in instruction cache accesses.

17 Claims, 5 Drawing Sheets

Next Fetch Program Counter = B+0, Fetch End = 12

Next Fetch Program Counter = C+4, Fetch End = 9

Next Fetch Program Counter = D, Fetch End = ?

FETCH WIDTH PREDICTOR

BACKGROUND

1. Technical Field

This disclosure relates generally to computer processors, and more particularly to instruction fetching from an instruction cache.

2. Description of the Related Art

Modern processors typically include an instruction cache to expedite fetching of program instructions. Instruction data may be pre-fetched into the instruction cache to avoid the delay involved in retrieving instruction data from memory or from a larger cache in hierarchical cache implementations. Processors may execute instructions out of program order and often execute more than one instruction per cycle. Thus, a processor may fetch data corresponding to multiple instructions each cycle. For example, a "fetch group" which may correspond to instruction data stored in one or more instruction cache lines may, in some implementations, include 32 bytes (256 bits) of instruction data, corresponding to sixteen 16-bit instructions or eight 32-bit instructions.

Often, a processor will not actually use all instructions in a fetch group. For example, if there is a control transfer instruction in a fetch group, instructions in the fetch group after the control transfer instruction may not be executed. Branches, calls, returns, etc. are examples of control transfer instructions. Furthermore, the prevalence of taken branches is relatively high in many sequences of executed program instructions.

SUMMARY

This disclosure relates to a processing unit configured to predict instruction fetch widths for fetches from a processor instruction cache. In some embodiments, the processing unit may predict the instruction fetch width based on the location of a predicted-taken control transfer instruction. The instruction cache may be configured to output a group of instructions in response to receiving an instruction fetch request that includes a fetch width. The group of instructions may have a number of bits corresponding to the fetch width. The number of bits may be less than a maximum number of bits that the instruction cache is configured to provide in response to a given instruction fetch request. For example, in some embodiments, an interface or bus between the instruction cache and other processing elements may have a particular width and may be configured to transfer at most a maximum number of bits per clock cycle.

In one particular embodiment, a next fetch predictor may be a single-cycle predictor configured to predict a next fetch address and a next fetch width in response to receiving a fetch request in a first processor cycle. The next fetch predictor may provide the predicted next fetch address and next fetch width during a second processor cycle that is immediately subsequent to the first clock cycle. In one particular embodiment, the instruction cache may be configured to output up to 32 bytes of instruction data in response to a given fetch request. In response to the predicted next fetch width, the instruction cache may output less than 32 bytes of instruction data from a location indicated by the next fetch address. In this manner, instructions that are beyond the fetch width will not be available to the processor as a result of that read. This approach may, in certain instances, reduce processor power consumption.

This specification includes references to "one embodiment," "an embodiment," "one implementation," or "an implementation." The appearances of these phrases do not necessarily refer to the same embodiment or implementation. Particular features, structures, or characteristics may be combined in any suitable manner consistent with this disclosure.

DETAILED DESCRIPTION

Figure 1:
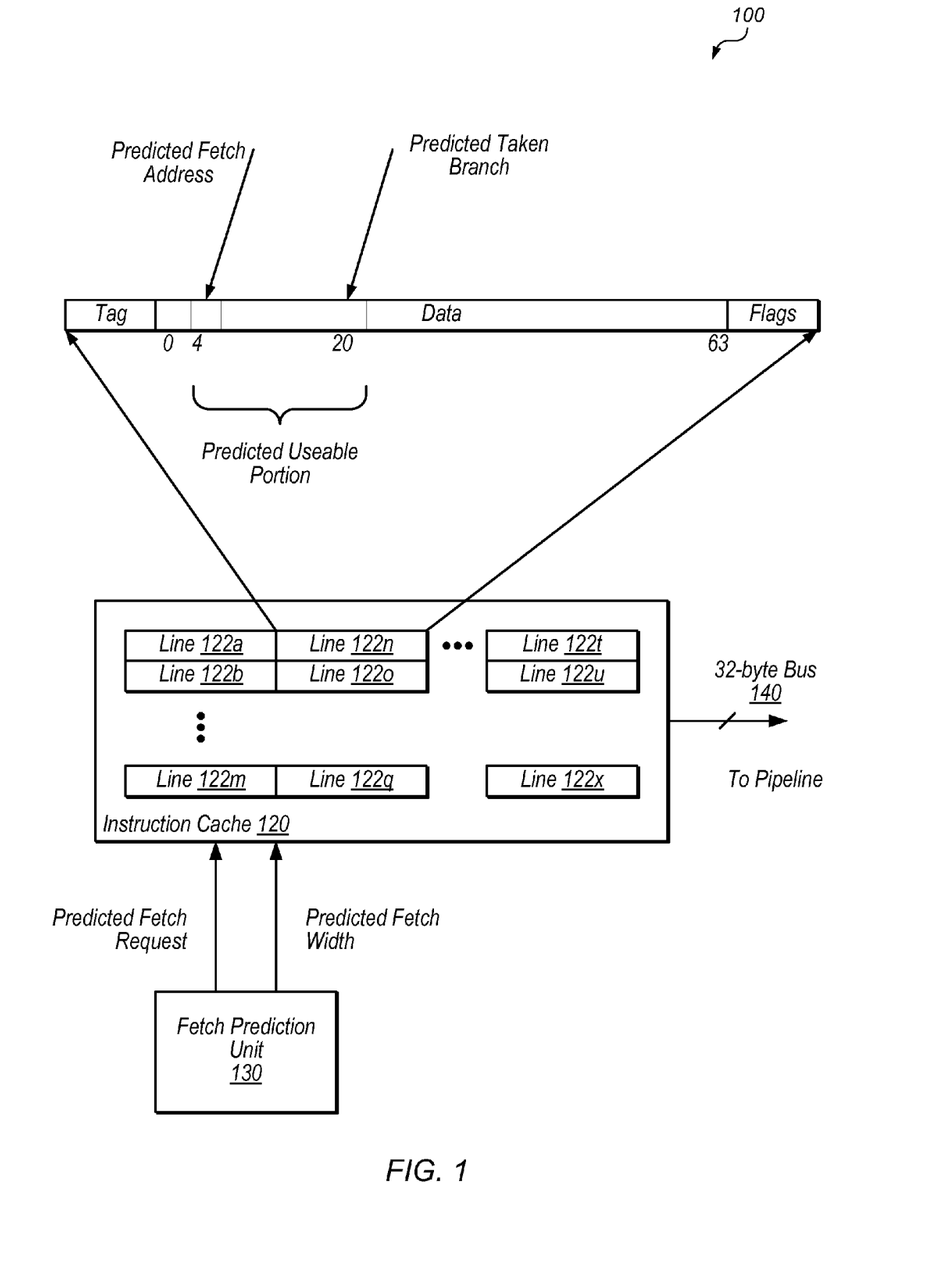
FIG. 1 is a block diagram illustrating one embodiment of an instruction cache and a fetch prediction unit of a processor.

Referring to FIG. 1, a generalized block diagram illustrating one exemplary embodiment of a portion of a processor 100 is shown. Processor 100 includes instruction cache 120 and fetch prediction unit 130. Fetch prediction unit 130 may predict fetch request addresses to be fetched from instruction cache 120. In some embodiments, fetch prediction unit 130 may also predict a fetch width to be fetched from instruction cache 120.

Instruction cache 120 includes cache lines 122a-122x, each of which may include a number of bytes of instruction data. The size of a cache line may correspond to the minimum amount of data per transfer from another cache (e.g., an L2 cache) or a memory to instruction cache 120. An instruction fetch unit (not shown) or some other processing element may send a fetch request with a fetch address to instruction cache 120. If instruction cache 120 contains instruction data corresponding to the fetch address, instruction cache 120 may fetch the instruction data and provide it to another processing element such as a decode unit, for example. If instruction cache 120 does not contain instruction data corresponding to a fetch request address, processor 100 may be configured to load the instruction data from a cache or memory into instruction cache 120.

As used herein, the terms "processing element" and/or "processing unit" may refer to various elements or combinations of elements. Processing elements include, for example, portions or circuits of individual processor cores, entire processor cores, and individual processors.

In this embodiment, instruction cache 120 is illustrated as an associative cache and may include a number of cache ways as shown in FIG. 1. In various embodiments, instruction cache 120 may be a 2-way cache, an 8-way cache, or any other appropriate number. Each way may include a number of cache lines (e.g., a first way in FIG. 1 includes at least cache lines 122a, 122b, and 122m). Alternatively, instruction cache 120 may be a direct mapped cache. In one embodiment, each cache line includes 64 bytes of instruction data, a tag, and flag data. The flag data may indicate whether a cache line is loaded with valid data. The tag may include part of the address of instruction data in a cache line. In the illustrated embodiment, instruction cache 120 is coupled to a processor pipeline through 32-byte bus 140. In this embodiment, instruction cache 120 is configured to provide a maximum of 32 bytes of instruction data in response to a given instruction fetch request. In other words, for any fetch request, instruction cache 120 is configured to output at most 32 bytes of instruction data in this embodiment. However, for some fetch requests, instruction cache 120 may output less than 32 bytes of instruction data (i.e., less than the maximum size of a fetch group or the maximum size instruction cache 120 is configured to provide in response to a given fetch request) as will be described in further detail below. The instruction data for a given fetch request may be provided from a single cache line or from multiple cache lines. For example, 32 bytes of instruction data may be provided from cache line 122a for a particular fetch request. As another example, 8 bytes of instruction data may be provided from line 122a and 24 bytes of instruction data may be provided from line 122b in order to provide 32 bytes of instruction data.

Fetch prediction unit 130 is coupled to instruction cache 120 and may be configured to provide predicted fetch request and predicted fetch width information to instruction cache 120. Instruction cache 120 may read and/or output less than 32 bytes of instruction data (i.e., less than a maximum amount of instruction data available for a given fetch request) based on the predictions from fetch prediction unit 130.

As used herein, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Further, the term "configured to" is used herein to connote structure by indicating that units/circuits/components include structure (e.g., circuitry) that performs a certain task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

Often, a processor will not actually use all instructions in a fetch group (i.e., a group of instructions provided in response to a fetch request). For example, if there is a taken branch in a fetch group, instructions in the fetch group after the branch may not be executed. Furthermore, the prevalence of taken branches is relatively high in many sequences of executed program instructions. Accordingly, as the width of the fetch group grows, so does the likelihood that a taken branch will result in unused instructions in the fetch group.

In many cases, a relatively wide static (i.e., unchanging) fetch width may waste power in that it causes instructions to be read from the instruction cache that are ultimately not used (executed) by the processor. On the other hand, a relatively narrower static fetch width may degrade processor performance by not fetching enough instructions. For example, if instruction data includes a taken branch after every ten instructions on average and a processor statically fetches twenty instructions from an instruction cache per fetch group, roughly half of the power used to read the fetch group could be said to be wasted (on average). Conversely, a smaller static fetch group (e.g., five instructions) might supply insufficient instruction data to a processor. Therefore, in embodiments disclosed herein, fetch prediction unit 130 may be configured to dynamically generate predicted fetch widths. In other words, instruction cache 120 may provide a number of bytes of instruction data based on a predicted fetch width. The fetch width prediction is said to be "dynamic" in that may vary from one fetch width prediction to the next.

For example, consider a situation in which the data portion of instruction cache line 122n contains thirty-two 16-bit instructions. As discussed above, the tag portion of line 122n may contain a portion of an address, and the flags may indicate whether the data in line 122n is valid. In the example of FIG. 1, the addresses of the instructions in line 122n range from a base address A+0 to an address A+63, each address corresponding to a byte of instruction data.

In the illustrated example situation, a predicted fetch address corresponding to the predicted fetch request is located at A+4. In other words, fetch prediction unit 130 has predicted an instruction fetch to address A+4 (i.e., starting with a 16-bit instruction residing at A+4 and A+5). In this example, a predicted-taken branch corresponding to the predicted fetch width is located at A+20. In other words, fetch prediction unit 130 has predicted that an instruction located at A+20 is a taken branch. In describing various embodiments, branches are used as one non-limiting example of a control transfer instruction. Further, the terms "branch prediction information," and "branch predictor" refer to prediction information and predictors for various control transfer instructions in addition to branches.

For a given program or portion of a program, flow typically proceeds in a sequential fashion. Consider the following group of instructions: 1d mem1→r1; add r1, r2→r3; st r3→mem2. In this exemplary sequence, execution and completion proceeds sequentially from the load instruction to the add instruction to the store instruction. This sequential ordering can be considered the program flow default. In this example, none of these instructions affects the selection of the next instruction to be executed and completed (beyond the default behavior).

In contrast, the execution and completion of instructions with certain opcodes potentially affects the selection of the next instruction to be executed and completed. These instructions are referred to herein as "control transfer instructions." Control transfer instructions may include, without limitation, branches, jumps, calls, returns, etc. Instructions of these types can cause a change in the default behavior of the next instruction to be executed and completed. Control transfer instructions may be used, for example, to execute a loop of instructions.

There may also be many different types of control transfer instructions. For example, control transfer instructions may operate conditionally (i.e., setting the program counter based on whether some condition is true or false) or unconditionally. Similarly, certain control transfer instructions may specify direct target addresses; other control transfer instructions may specify indirect target addresses. Note that the execution and completion of control transfer instructions may have affects on processor state other than on the location of the next instruction (e.g., there might be an instruction that branches after performing an arithmetic operation).

If it is the case that the predictions in the example given above are correct, only 18 bytes of instruction data from A+4 to A+21 is useable in the relatively-near future by processor 100. Requested instructions are predicted to start at address A+4, and the predicted taken branch at A+20 means that instruction fetching will continue at an address within another fetch group. Accordingly, instructions before and after the A+4 to A+21 portion of a 32-byte fetch group from cache line 122n will not be used immediately in the current instruction flow. For this reason, instruction cache is configured to read only instruction data corresponding to instructions at addresses A+4 through A+21 based on the predicted fetch width from fetch prediction unit 130 in order to save power.

As used herein, the term "fetch width" is indicative of an amount of instruction data (e.g., a number of bits or bytes) from instruction cache 120. In some embodiments, a fetch width value may be an encoding for a number of bits/bytes to be fetched (e.g., a fetch width value might be a two-bit value that could be used to indicate whether to fetch 8 bytes, 16 bytes, 24 bytes or 32 bytes from an instruction cache). In another embodiment, each bit of a fetch width value may indicate whether a particular portion of one or more cache lines should be fetched (e.g., bit 1 indicates whether to fetch a first portion, bit 2 indicates whether to fetch a second portion, and so on). In other embodiments, a fetch width value may directly specify the number of instructions to be fetched (e.g., the values for 8 bytes, 16 bytes, 24 bytes, or 32 bytes may be directly encoded).

In some embodiments, a separate value may be used to specify the location within a cache line at which to begin a given fetch. In some implementations, this value may be referred to as a "fetch location." In the example above, the fetch location could be specified as an offset of 4 within the cache line, with a corresponding fetch width of 18 bytes. In some implementations, a fetch width may include both a width value and a fetch location, but as used herein, a fetch width specifies at least an indication of a width value (and not necessarily a fetch location).

As noted above, the term "fetch width" is used in this disclosure to mean a value that is indicative of the amount of instruction data to be fetched from instruction cache 120. In some embodiments in which a fetch location is specified by prediction hardware, fetch width may be indicated as an ending location within a cache line, i.e. a "fetch end." In other words, the fetch location may specify the beginning location within a cache line and the fetch width may specify the ending location within the same cache line or another cache line. In such an implementation, the fetch width value is indicative of the number of instructions to be fetched from the cache by implicitly specifying a width relative to the fetch location. Stated another way, fetch width may either explicitly or implicitly specify a number of instructions to be fetched from instruction cache 120. In the example above, the fetch width could be specified as a fetch end indicating an offset of 21 within the cache line.

Figure 2:
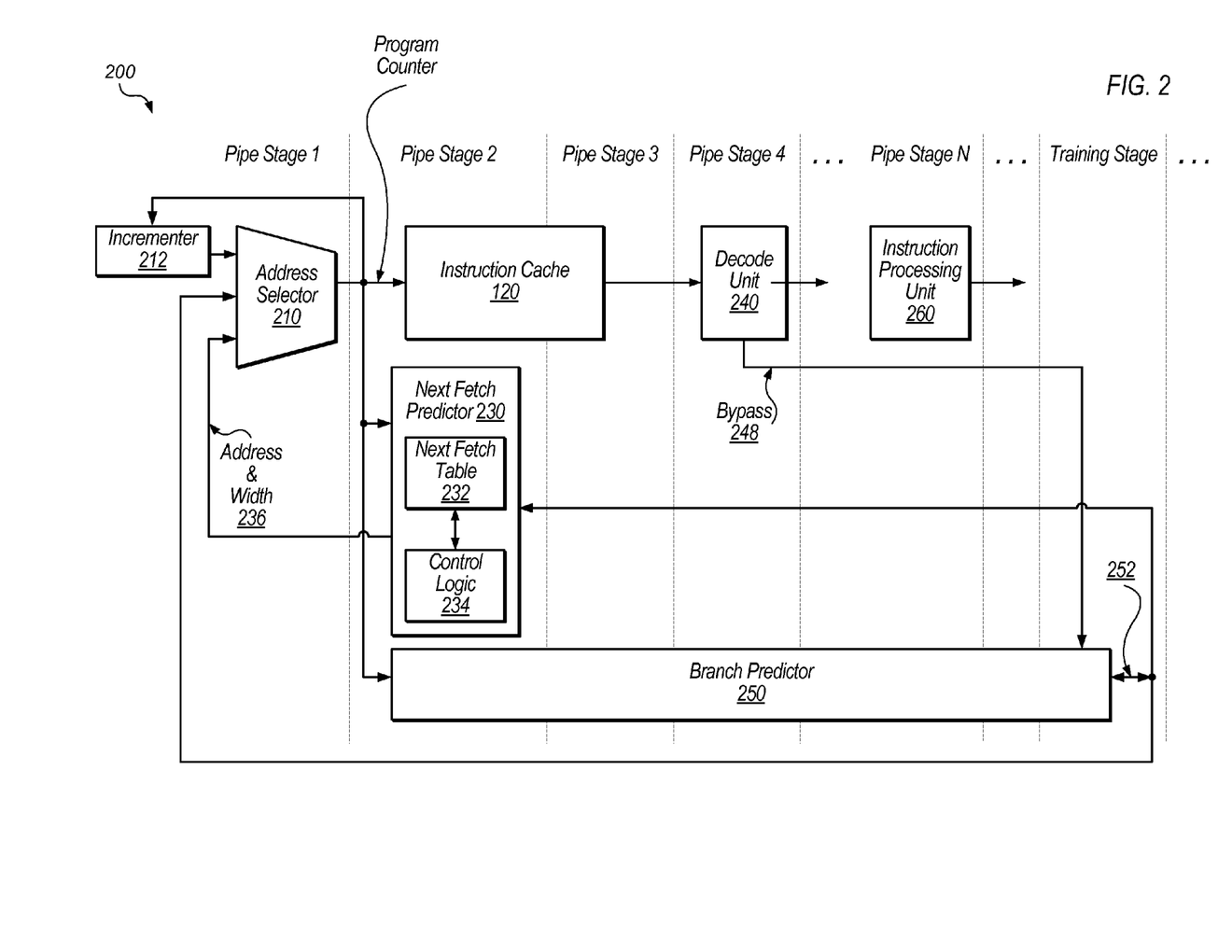
FIG. 2 is a block diagram illustrating one embodiment of a front-end of a processor pipeline.

As will be described below, the concept of a fetch width may be used, in some instances, to fetch instructions between a predicted fetch address and a predicted-taken control transfer instruction. FIG. 2, which is described next, depicts an exemplary processor pipeline that uses the concept of fetch width. In some embodiments, the use of fetch width may lead to increase in processor performance and/or reduced power consumption.

Referring to FIG. 2, a generalized block diagram illustrating one embodiment of a front-end pipeline 200 of processor 100 is shown. This arrangement is merely exemplary. The embodiments disclosed herein can be used with numerous different arrangements of circuitry within processor 100.

In the embodiment shown, pipeline 200 is a multi-stage pipeline for processing of instructions. The concept of a processor "pipeline" is well understood, and refers to the concept of splitting the "work" a processor performs on instructions into multiple stages. In one embodiment, instruction decode, dispatch, execution, and retirement may be examples of different pipeline stages. Many different pipeline architectures are possible. Various pipeline stages perform such steps on an instruction during one or more processor clock cycles, then pass the instruction on to other stages for further processing.

An instruction cache 120 may store instructions for a software application (a user application, operating system, etc.) executing on processor 100. One or more instructions indicated by a program counter (PC) address conveyed by the address selector 210 are fetched (i.e., retrieved) from the instruction cache 120. Multiple instructions may be fetched from the instruction cache 120 per clock cycle if there are no instruction cache misses (i.e., the requested instructions are currently located in instruction cache 120).

In certain embodiments, the processor 100 may implement an address translation scheme allowing one or more virtual address spaces to be made visible to executing software. Memory accesses within the virtual address space may be translated to a physical address space corresponding to the actual physical memory available to the processor 100. In embodiments of processor 100 that employ address translation, the instruction cache 120 may be partially or completely addressed using physical address bits rather than virtual address bits. For example, the instruction cache 120 may use virtual address bits for cache indexing and physical address bits for cache tags. In order to avoid the cost of performing a full memory translation when performing a cache access, the processor 100 may store a set of recent and/or frequently used virtual-to-physical address translations in a translation lookaside buffer (TLB), which is not shown in FIG. 1.

In the embodiment shown, the current fetch address supplied to instruction cache 120 comes from address selector 210. In this particular implementation, selector 210 receives three different inputs (other numbers of inputs are possible depending on what sort of prediction logic is used). One input to selector 210 is supplied by incrementer 212, which supplies a next sequential PC address (i.e., the next PC assuming that there is not a taken control transfer instruction). Other inputs are supplied to selector 210 by next fetch predictor 230 and branch predictor 250. As can be seen from the depiction of pipeline stages in FIG. 2, next fetch prediction 230 is configured to generate address and width prediction 236 prior to predictions generated by branch prediction 250.

In one embodiment, next fetch predictor 230 may generate a non-sequential PC address based on a prediction for a given control transfer instruction that is relatively faster than a corresponding prediction for the given branch instruction that is made by branch prediction 250. In some embodiments, next fetch predictor 230 may correspond to the fetch prediction unit of FIG. 1. In one embodiment, the next fetch predictor 230 includes a next fetch table 232 and control logic 234. In some embodiments, next fetch predictor 230 accesses branch prediction information based on the PC address. A hit in the next fetch table 232 may provide a next PC address and next fetch width 236 to use for fetching instructions from the instruction cache 120. In one embodiment, control logic 234 combines, in a hash function, one or more portions of the PC address used to fetch instructions and/or other values. In certain embodiments, this hash function may be a relatively fast exclusive-or (XOR) combinatorial (or combinational) function, and the output of this hash function may be used to index into the next fetch table 232. In one embodiment, next fetch predictor 230 is a single-cycle predictor, meaning that predictor 230 generates prediction 236 receives inputs at the beginning of a given clock cycle and then produces the prediction by the end of that clock cycle such that prediction 236 is available to other units within pipeline 200 in an immediately subsequent clock cycle.

In one embodiment, branch predictor 250 also receives at least a portion of the PC address used to fetch instructions from the instruction cache 120. Using this and other information, predictor 250 may also perform a prediction of the direction and target of a control transfer instruction that was predicted by predictor 230. The prediction of predictor 250 may, in many embodiments, be relatively slower (and thus more accurate) than the prediction generated by predictor 230. For instance, branch predictor 250 may also combine, in a separate hash function, at least a portion of the received PC address with another portion of itself or with other values, such as history information. Various hashing functions may be performed to determine an index to one or more pattern history tables (PHTs), branch target buffers (BTBs), and/or other tables used to provide branch prediction data 252. The branch prediction data 252 may include a branch direction and a branch target address. The branch predictor 250 may utilize multiple clock cycles to both determine the outcome of the condition of a control transfer instruction and to determine the branch target address.

The branch predictor 250 may thus provide branch prediction data 252 with higher prediction accuracy than the next fetch predictor 230. For performance reasons, however, it may be desirable to obtain a faster prediction. Therefore, the next fetch predictor 230 may used to provide a quick, initial branch prediction and fetch width. In the illustrated embodiment, next fetch predictor 230 provides a predicted next address & width 236 to instruction cache 120 through address selector 210. In other embodiments, next fetch predictor 230 may provide predicted fetch address and fetch width information 236 to instruction cache 120 through other communication paths. The branch predictor 250 may perform a parallel, slower branch prediction and/or width prediction, which may or may not confirm prediction 236.

The prediction data generated by the next fetch predictor 230 may be stored and staged along the pipeline for processor 100, i.e., made available to various pipeline stages. The staged prediction data may be compared to prediction data generated at a later pipeline stage by the branch predictor 250 or completion data generated from execution and completion of control transfer instructions. When the next fetch predictor 230 generates branch prediction data that does not match prediction data 252 generated by the branch predictor 250 at a later time, the next fetch predictor 230 may be updated or trained with the prediction data 252 generated by the branch predictor 250 (e.g., during the training stage of FIG. 2). Next fetch predictor 230 may be similarly trained at retirement or completion of relevant instructions. As used herein, training the next fetch predictor 230 may include writing or updating stored parameters in the next fetch predictor 230 based on branch prediction data 252 generated by the branch predictor 250. Note that the training stage may precede pipeline stage N in some embodiments; the ordering of pipeline stages in FIG. 2 is intended to be exemplary of one embodiment and not to exclude other implementations.

Decode unit 240 may, in one embodiment, decode the opcodes of the multiple fetched instructions. Alternatively, the instructions may be divided into micro-instructions, or micro-ops. As used herein, the terms "instructions" and "micro-ops" are interchangeable as the invention may be used with an architecture that utilizes either implementation. The decode unit 240 may send the instructions with additional decoded information to other components in the processor 100 for instruction processing in later pipeline stages.

These later pipeline stages are generically represented by instruction processing unit 260. For example, the decode unit 240 may allocate entries in a dispatch queue. Register renaming, instruction scheduling, executing arithmetic operations and/or performing memory accesses, and in-order retiring are just some examples of later instruction processing steps. In one embodiment, decode unit 240 may forward data to a later pipeline stage while bypassing other pipeline stages. For example, in order to train next fetch predictor 230 with fetch width information, decode unit 240 may decode control transfer instructions and forward decoded instruction information to next fetch predictor 230 and/or branch predictor 250 for use during a training stage of the pipeline. Such a configuration is shown in FIG. 2 as bypass 248.

Figure 3:
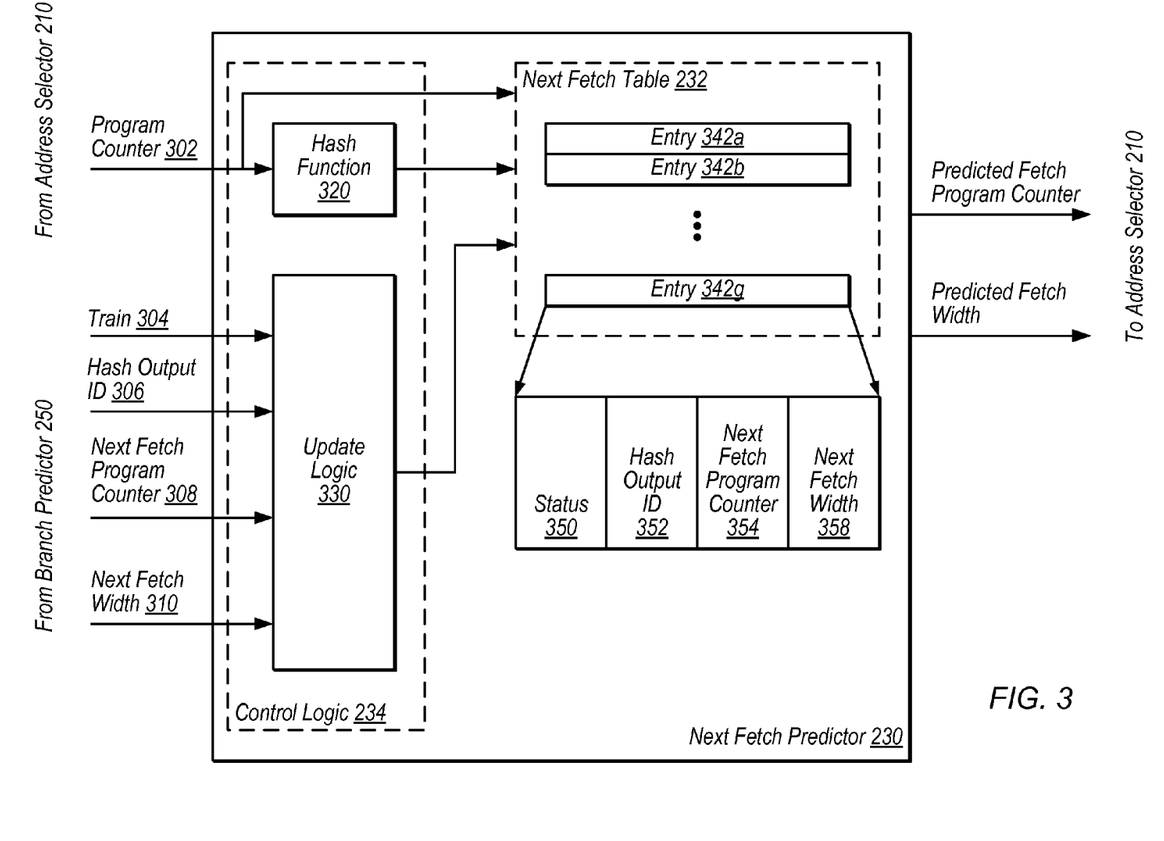
FIG. 3 is a block diagram illustrating one embodiment of a next fetch predictor.

Turning now to FIG. 3, a generalized block diagram of one embodiment of a next fetch predictor 230 is shown. In the illustrated embodiment, next fetch predictor 230 includes control logic 234 and next fetch table 232, which may be configured as described above with reference to FIG. 2 for similarly numbered elements. As shown, the next fetch predictor 230 receives a current fetch PC 302. In one embodiment, the received current fetch PC 302 may include a sufficient number of bits of an address used to fetch instructions from the instruction cache 120 that identifies a current control transfer instruction. The current fetch PC 302 may be supplied from the address selector 210 in one implementation.

In some embodiments, the current fetch PC 302 is used to access next fetch table 232 in order to predict a next fetch PC and/or next fetch width. In one embodiment, next fetch table 232 may be indexed by at least the output of the hash function 320. The next fetch table 232 stores information corresponding to control transfer instructions and be used to generate branch prediction data. In one embodiment, the branch prediction data may include a branch direction and a branch target address, such as a predicted next fetch PC address. The branch prediction data may also include a fetch width, indicative of an amount of instruction data (e.g., how many bits or bytes) to be fetched from instruction cache 120. The next fetch table 232 may store information for both conditional and unconditional control transfer instructions. In addition, the next fetch table 232 may store information for direct and indirect control transfer instructions. In general, next fetch table may store prediction data for any type of control transfer instruction. In one embodiment, next fetch table 232 may store predicted fetch widths for fetch groups that are not predicted based on a predicted-taken branch as well as for fetch groups that are predicted based on a predicted taken branch. In other words, next fetch table 232 may store predicted fetch widths corresponding to sequential fetch groups in situations where next fetch predictor 230 does not predict a taken branch. In this embodiment, next fetch predictor 230 may allocate an entry in next fetch table 232 for every fetch group fetched from instruction cache 120, or may allocate an entry for every fetch group fetched from instruction cache 120 that includes a predicted-taken control transfer instruction.

A conditional branch instruction performs a determination of which path to take in an instruction stream. If the branch instruction determines a condition is not satisfied, then the branch instruction is considered to be not-taken and the next sequential instruction in program order is executed. If the branch instruction determines a condition is satisfied, however, then the branch instruction is considered to be taken. For a taken branch instruction, an instruction that is not the next sequential instruction in program order, but rather is located at a computed branch target address, is executed. The "direction" of a control transfer instruction refers to whether the control transfer instruction is taken. For example, predicting a direction of a conditional branch involves predicting whether or not the branch is taken. An unconditional branch instruction is considered an always taken conditional branch instruction. There is no condition to test, and execution of instructions occurs in a different sequence than sequential order. Thus, the prediction of the direction of unconditional branches will always be correct (absent exceptional circumstances) since they are always taken. For conditional branches, however, the prediction of the direction of the branch may or may not be correct. Accordingly, the direction of certain conditional branches may be mispredicted. When a conditional branch instruction is executed and retired (i.e., is not executed in a speculative manner), the direction of the branch (i.e., whether or not the branch was taken) is unequivocally determined, and the direction of the branch can be used to update one or more branch predictors (e.g., units 230 and 250).

For a direct branch instruction, a branch target address may be specified by an offset, which may be stored in the branch instruction itself, relative to the program counter (PC) value. For an indirect branch instruction, a branch target address may be specified by a value in a register or memory, wherein the register or memory location may be identified in the branch instruction. Further, the register or memory location specifying the branch target address may be loaded with different values. Note that the discussion above relating to branches applies with equal force to various other control transfer instructions. The application of the techniques disclosed herein are applicable to any suitable type of control transfer instructions, including those based on conditional transfers, those based on unconditional transfers, those with directly specified transfer addresses, those with indirectly specified transfer addresses, etc.

In one embodiment, the next fetch table 232 has multiple entries 342a-342g. Each one of the entries 342a-342g may include several fields, such as at least fields 350-358. In one embodiment, field 350 stores status information, such as an indication of validity of the entry (e.g., a valid bit). Field 352 stores a hash output identifier (ID). This identifier value may be a value generated by the hash function 320 at an earlier time, and is used to determine whether an entry produces a "hit" in next fetch table 232. In one embodiment, field 352 may store additional bits of the fetch PC address that is hashed. In other embodiments, the hash output ID is sufficient for providing a quick and distinct lookup into the next fetch table 232.

In the embodiment shown, field 354 in table 232 stores a predicted next fetch PC for a corresponding control transfer instruction. Field 358, on the other hand, stores a predicted next fetch width value for a fetch corresponding to the predicted next fetch PC. In one embodiment the next fetch width 358 indicates the location of a predicted taken control transfer instruction within a fetch group corresponding to the predicted next fetch PC. In some embodiments, the next fetch width 358 may also include information corresponding to a fetch location (i.e., information specifying the first instruction to fetch) within a fetch group corresponding to the predicted next fetch PC. In general, the next fetch width 358 may include information indicating predicted usable portions of a fetch group corresponding to the predicted next fetch PC.

In one embodiment, a hashing of the bits of the received current fetch PC 302 is performed with itself by the hash function 320. In one example, an offset portion of the current fetch PC 302 may be combined with the upper bits of the current fetch PC 302 by an exclusive-or (XOR) combinatorial function within the hash function processing element 320. In other examples, the offset portion may be combined with bits other than each of the upper bits of the current fetch PC 302. In addition, non-consecutive bits and other combinatorial logic may be used. Other values (not shown) may be used, such as history information, a count value, and so forth. Numerous such alternatives are possible and are contemplated. However, in various embodiments, the generation of branch prediction data by the next fetch predictor 230 may be expected after a single clock cycle. In other words, if a fetch request is received during a first clock cycle, next fetch predictor 230 may be configured to generate branch prediction data during a second clock cycle that is immediately subsequent to the first clock cycle. (The phrase "immediately subsequent" in this context means that there are no other clock cycles between the first clock cycle and the second clock cycle.) As used herein, the term "clock cycle" may refer to a cycle of a processor clock. Information may be latched between elements of pipeline 200 on either rising or falling edges of the processor clock, or both. Therefore, the functionality of the hash function 320 may be directed to quick and efficient hashing calculations. In some embodiments, next fetch predictor 230 may predict a fetch width for a current fetch request. In some embodiments, next fetch predictor 230 may predict fetch widths for subsequent fetch requests.

In one embodiment, the output of the hash function 320 (among other things) may be used to index into next fetch table 232. A comparison of the output of the hash function 320 may be performed with the hash output IDs stored in field 352 of entries 342a-342g. If a match is found and the entry is valid, the corresponding next fetch PC and next fetch width stored in fields 354 and 358 may be read from the next fetch table 232. A status field 350 may indicate whether or not an entry is valid and a hash output ID 352 may be used to identify the corresponding control transfer instruction (i.e., that may be used to identify the entry for a subsequent occurrence of the control transfer instruction) may be grouped with the data stored in fields 354 and 358. All of this data may be staged and sent to later pipeline stages to be used by control logic in the branch predictor 250. For example, a predicted fetch program counter 354 and predicted fetch width 358 corresponding to the next fetch PC and next fetch width may be provided to address select 210 in one embodiment. The branch predictor 250 may verify whether the received data agrees branch prediction data it generates at a later time. In addition to sending data to the branch predictor 250, the next fetch PC and next fetch width read from the next fetch table 232 are sent to the address selector 210, and potentially on to instruction cache 120.

In one embodiment, next fetch predictor 230 may also receive information from the branch predictor 250. This information may be received after the branch predictor 250 verifies whether the branch prediction data from the next fetch predictor 230 matches branch prediction data generated by the branch predictor 250. The next fetch predictor 230 may receive a training control signal 304, a hash output ID 306, a next fetch PC address 308, and a next fetch width 310 for a given control transfer instruction. This received data from branch predictor 250 may be sent to update logic 330. The update logic 330 may determine when to write data to the next fetch table 232 and which entry of the entries 342a-342g to modify.

The training control signal 304 may be an indication from the branch predictor 250 to modify a particular entry in the next fetch table 232. The hash output ID 306 may be used to index into the next fetch table 232 and identify a given entry of the entries 342a-342g. The next fetch PC 308 may be used to overwrite a PC value stored in field 354 of an identified entry. Similarly, the next fetch width may be used to overwrite an indication stored in field 358 of an identified entry. Training may occur based on mismatches between branch prediction data generated by next fetch unit 230 and branch prediction unit 250, and/or based on mismatches between branch prediction data generated by next fetch unit 230 and the actual direction of a control transfer instruction. The training control signal 304 or other indicators sent to the next fetch predictor 230 may identify which fields to overwrite in an identified entry. In some cases, both the next fetch PC and the fetch width may be updated. In other cases, one of these two values is updated while the other of the two values is unmodified.

In some embodiments, a completion unit or some other processing element may train next fetch predictor 230 based on completion or retirement of control transfer instructions. Such training may be performed using signals similar to those described above with reference to training of next fetch predictor 230 by branch prediction unit 250.

The next fetch predictor 230 of FIG. 3 may facilitate reducing power consumption in a processor by predicting fetch widths. Power consumed fetching instruction may correspond to the number of bits fetched from the instruction cache, i.e., fetching more bits requires more power. Therefore, predicting fetch widths may allow instruction cache 120 to fetch a number of bits that is less than a maximum fetch group size, thus reducing power consumption compared to always fetching the maximum fetch group size.

Figure 4A:
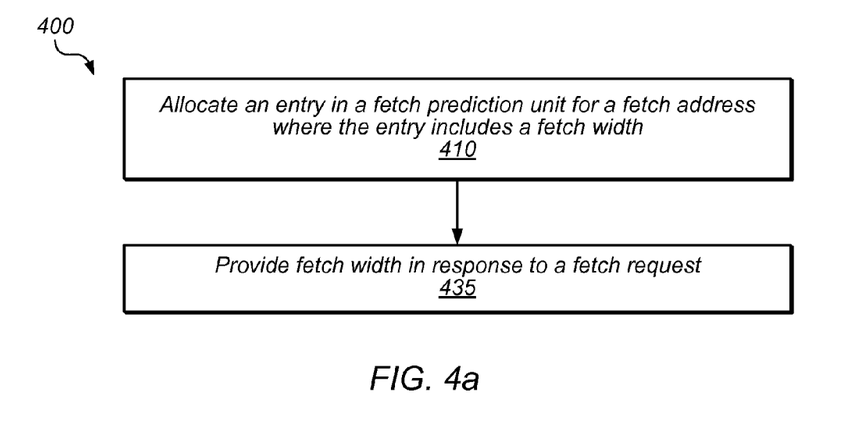
FIGS. 4a-4b are flow diagrams illustrating various exemplary embodiments of operation of the front-end pipeline of FIG. 2.

Referring now to FIG. 4a, a flow diagram for an exemplary method 400 is shown. Flow begins at block 410. At block 410, an entry is allocated for a fetch address in next fetch table 232. In one embodiment, update logic 330 allocates the entry. The entry includes a fetch width. In one embodiment, this allocation takes place during a training stage of a processor pipeline, such as the training stage of FIG. 2. An entry such as entry 342g of FIG. 3 may be allocated for a fetch address and may include next fetch PC next fetch width fields. Information may be stored in these fields based on a fetch request subsequent to a fetch request to the fetch address for which the entry is allocated. Flow proceeds to block 435.

At block 435, the fetch width is provided in response to a fetch request. In one embodiment, next fetch predictor 230 provides the fetch width. The fetch width may correspond to the predicted width of a current fetch request or the predicted width a subsequent fetch request. If the fetch width corresponds to a subsequent fetch, it may correspond to a predicted next fetch request, where a processor is configured to fetch the predicted next fetch request in a processor cycle immediately following the fetch request. Flow ends at block 435. The method shown in FIG. 4a may be used in conjunction with any of the computer systems, devices, or components disclosed herein, among other devices. In various embodiments, some of the method elements shown may be performed concurrently, in a different order than shown, or may be omitted. Additional method elements may also be performed as desired. In some embodiments, steps 410 and 435 of method 400 are executable as separate methods—one method for allocating an entry (step 410), and a distinct method for using an entry (step 435). Accordingly, step 435 can be performed without step 410, and vice versa.

Figure 4B:
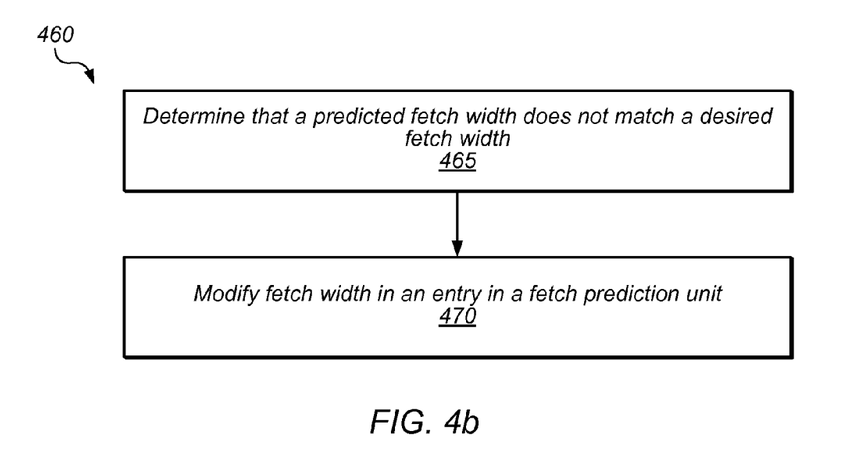

Referring now to FIG. 4b, a flow diagram for an exemplary method 460 is shown. Flow begins at block 465. At block 465, it is determined that a predicted fetch width does not match a desired fetch width. In one embodiment, branch predictor 250 makes this determination. This situation may occur when next fetch predictor 230 mispredicts a control transfer instruction. For example, consider a situation in which next fetch predictor 230 predicts a taken branch in a fetch group and predicts a fetch width corresponding to instructions up to and including the taken branch. If the branch is not taken (i.e., the prediction was incorrect), the fetch width is less than the desired fetch width because the branch was not taken and instructions after the branch should be fetched. In this instance, branch predictor 250 determines that the predicted fetch width is less than the desired fetch width. Flow proceeds to block 470.

At block 470, the fetch width of an entry in a fetch prediction unit is modified (e.g., update logic 330 modifies an entry in next fetch unit 230 in one embodiment). This modification may include replacing the fetch width with a wider fetch width corresponding to the maximum size of a fetch group or to the location of another predicted-taken branch. Flow ends at block 470.

In other embodiments, various elements of processor 100 may perform the described functions of FIGS. 4a-4b. The methods of FIGS. 4a-4b may allow for dynamic, efficient prediction of fetch widths from an instruction cache, resulting in power savings over implementations of fetch prediction units that do not predict fetch widths with little to no sacrifice in processor performance.

Figure 5A:
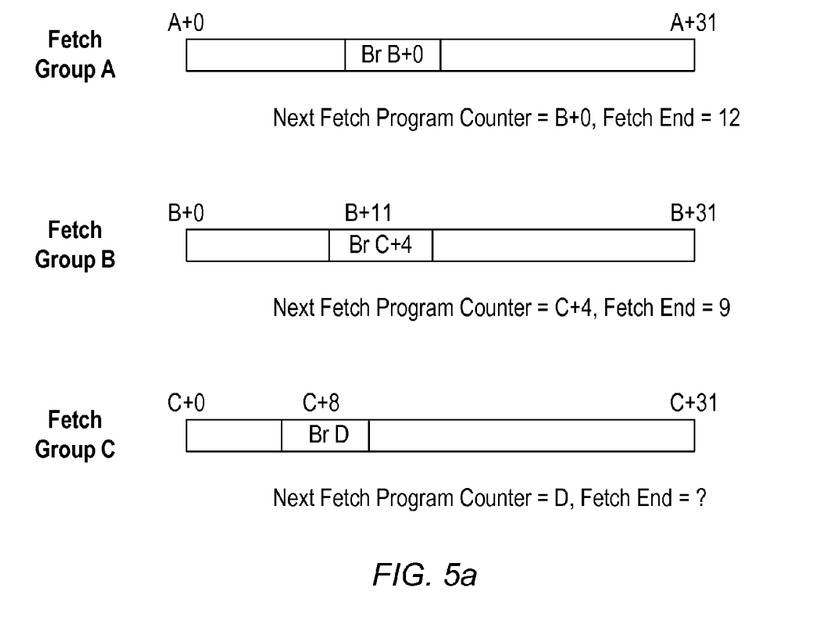
FIGS. 5a and 5b are diagrams illustrating exemplary instruction data.

Turning now to FIG. 5a, three fetch groups A-C are shown. In the example of FIG. 5a, each fetch group includes 32 bytes of instruction data which may be stored in one or more instruction cache lines. In the example of FIG. 5, each instruction includes 16 bits, so each fetch group includes 16 instructions. In one embodiment, a fetch width indicates a particular end byte of the fetch group (in some embodiments, a fetch location may also be indicated by a predicted fetch width, but in the exemplary embodiment of FIG. 5a, the next fetch address indicates the fetch location instead of the fetch width indicating the fetch location). In other words, instructions before the fetch location and after the instruction at the particular end byte indicated by the fetch group may not be fetched. In other embodiments, a fetch width may specify other granularities within cache lines and/or fetch groups, such as particular bits, bytes, or larger portions of a fetch group. For example, the fetch width field might use 3 bits to indicate one of eight larger regions of a fetch group or cache line. In one embodiment, the granularity of the fetch width field corresponds to the size of an instruction cache bank. An instruction cache bank, in this context, refers to a hardware configuration that determines a minimum number of bits that can be read from an instruction cache line at a time. For example, each instruction cache bank may hold 16 bits of instruction data, or any other appropriate number of bits.

Fetch group A includes a branch to an instruction at address B+0 in fetch group B. Similarly, fetch group B includes a branch to an instruction at address C+4 in fetch group C and fetch group C includes a branch to fetch group D (not shown).

Assume for purposes of this example that all control transfer instructions in the example of FIG. 5a are predicted as taken, and are correctly predicted. Further assume that a fetch predictor such as next fetch predictor 230 of FIG. 2 includes entries with predicted next fetch addresses and next fetch widths for addresses corresponding to fetch groups A-C.

In one example, in a first processor cycle, a fetch request to an address in fetch group A (e.g., address A+2) arrives at next fetch predictor 230 and instruction cache 120. Fetch predictor 230 may index into next fetch table 232 based on at least a portion of address A+2 to predict that the next fetch PC is address B+0 and that the next fetch end is byte 12 (because the taken branch in fetch group B is located at bytes 11 and 12 of fetch group B).

In a second processor cycle (e.g., a cycle immediately following the first processor cycle), the predicted next fetch address (B+0) and fetch end (12) arrive at instruction cache 120 and next fetch predictor 230. In the second processor cycle, address selector 210 passes the fetch address and fetch width 236 from next fetch predictor 230, e.g., based on a signal from next fetch predictor 230 indicating that a predicted next fetch address should be used rather than the output of incrementer 212 or branch predictor 250. Based on the fetch width, only bytes B+0 through B+12 of fetch group B are read from instruction cache 120. This conserves power compared to reading the entire fetch group B because bytes B+13 through B+31 are not read. In the same cycle, next fetch predictor 230 indexes into next fetch table 232 using at least a portion of address B+0 and predicts that the next fetch address will be address C+4 and predicts a fetch end of 9 (because the taken branch in fetch group C is located at bytes 8 and 9 byte of the fetch group).

In a third processor cycle (e.g., a cycle immediately following the second processor cycle), the predicted next fetch address (C+4) and fetch end (9) arrive at instruction cache 120 and next fetch predictor 230. Based on the fetch width, only bytes C+4 through C+9 of fetch group C are read from instruction cache 120 (a fetch width of 6 bytes fetched). In the same cycle, next fetch predictor 230 indexes into next fetch table 232 and predicts that the next fetch address will be address D and predicts a fetch end. In one instance, if there is no predicted-taken branch in fetch group D, next fetch predictor 230 might predict a fetch width of 32 or more generally a fetch width corresponding to the end of a fetch group.

Note that in other embodiments where a fetch prediction unit predicts only a next fetch group or cache line (and not an address within the group or cache line), information corresponding to a fetch location (in addition to the fetch end) may be included as part of a predicted fetch width. In various embodiments, various encodings, definitions, indications, and so on of predicted usable portions of a cache line or fetch group may be used in addition to the predicted fetch width described herein.

Now consider a situation in which next fetch predictor 230 does not contain valid entries corresponding to addresses in any of the fetch groups A-C. In this example situation, it is desirable to allocate entries in next fetch predictor 230 during processing of instructions in those fetch groups. Once the entries are allocated, fetch PC and fetch width prediction for subsequent fetch requests may proceed as described above.

In a first processor cycle of this exemplary situation, a request for an address in fetch group A (e.g., A+2) arrives at next fetch predictor 230 and instruction cache 120. In this instance there is a miss in next fetch predictor 230 because no valid entry corresponds to the requested address. In one embodiment, next fetch predictor 230 predicts that the next address is the instruction cache address that sequentially follows fetch group A (e.g., A+32 in the embodiment of FIG. 5a).

In a later processor cycle, instructions from fetch group A may reach a decode stage (e.g., decode unit 240 of pipeline 200). At this point, the branch instruction to fetch group B+0 may be decoded. In one embodiment, branch predictor 250 predicts whether the branch instruction is taken.

In yet a later processor cycle, (e.g., the training stage of FIG. 2), branch predictor 250 signals to update logic 330 to allocate an entry in next fetch table 232 corresponding to one or more addresses of fetch group A. At this pipeline stage, information relevant to predicting the next fetch PC is available (e.g., the decoded branch to B+0 if it is predicted-taken), but further information is needed for the fetch width (e.g., information about how many instructions to fetch from group B). In one embodiment, information from decode unit 240 is bypassed or forwarded to a training stage of the pipeline in order to determine a predicted next fetch width. In other words, decoded instruction information from fetch group B such as the location of a branch instruction to fetch group C is forwarded from the decode stage to the branch predictor training stage. In other embodiments, other configurations may satisfy timing constraints while providing instruction information to training stages and elements of a pipeline.

Update logic 330 may store address B+0 in field 354 and a fetch end of 12 in field 358 of an entry corresponding to one or more addresses in fetch group A in next fetch table 232. At this point, next fetch predictor 230 may be considered trained. In other words, next fetch predictor may provide a predicted next fetch PC (B+0) and next fetch width (12) in response to a subsequent fetch request to an address in fetch group A.

Entries in next fetch table 232 corresponding to one or more addresses in fetch groups B and C may be similarly allocated.

Note that entries in next fetch table 232 may be accessed and allocated in various embodiments using an index and/or tag (e.g., generated based on a portion of program counter 302, such as by hash function 320). Various methods for allocating entries in next fetch table 232 may be used and may displace other entries in next fetch table 232 in some instances. For example, in one embodiment in which next fetch table 232 is an associative table, a least-recently-used algorithm may be used to displace older entries. In one embodiment in which next fetch table 232 is not an associative table, a new entry may always displace a previous entry.

Finally, consider situations where control transfer instructions are mispredicted. For example, consider a situation in which a predicted-taken branch is not actually taken. In this instance, the predicted fetch width was narrower than a desired fetch width. Stated another way, since the branch was not taken, it would have been desirable to fetch instructions after the branch. Therefore, branch predictor 250 may retrain next fetch predictor 230 when branches are mispredicted. Retraining next fetch predictor 230 may include similar steps to allocating entries in next fetch table 232, except that entries are modified instead of allocated (e.g., by including a fetch width that will cause the fetching of a greater number of instructions upon a subsequent fetch request to a given address).

In one embodiment, branch predictor 250 may retrain next fetch predictor 230 when under-fetching occurs, but not when over-fetching occurs. Under-fetching occurs when a fetch width is too small, and not enough instructions are fetched (e.g., as discussed above, when a predicted-taken branch is not actually taken). Over-fetching occurs when a fetch width is too large, and unused instructions are fetched (e.g., a predicted-not-taken branch in a fetch group is actually taken).

For example, consider a situation in which a fetch group includes two branch instructions that alternate between taken and not taken (i.e., the first branch is taken, then the second branch, then the first, etc.). In this case, if next fetch predictor 230 was retrained on both over-fetching and under-fetching, over-fetching and under-fetching would alternatively occur every other cycle. This situation would result in wasting power when over-fetching and fetching insufficient instructions when under-fetching. Accordingly, retraining next fetch predictor 230 for under-fetching but not over-fetching keeps the larger next fetch width and minimizes under-fetching. In other embodiments, next fetch predictor 230 may be retrained when various combinations of over-fetching and/or under-fetching occur.

Figure 5B:
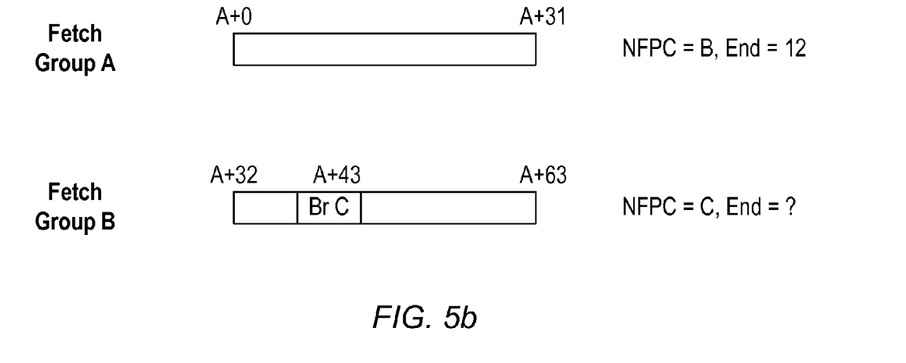

Turning now to FIG. 5b, two fetch groups A and B are shown. Note that in some embodiments, such as the example of FIG. 5a, next fetch predictor 230 may predict fetch a width only when it predicts a next fetch address. In other words, in these embodiments, when no fetch prediction is made and address selector 210 passes the incremented PC from incrementer 212, a fetch width may not be predicted and a fetch group of the maximum size may be fetched. In contrast, in the embodiment of FIG. 5b, next fetch predictor 230 allocates entries in next fetch table 232 even when a predicted next fetch address sequentially follows the first fetch address (i.e., even when a fetch group does not include a predicted-taken branch). This embodiment may require a larger next fetch table 232, which may, in certain circumstances, make it more difficult to achieve single-cycle fetch prediction. However, allocating entries in this manner may be preferable in some embodiments in order to minimize wasted fetch power. Assume for example that a fetch prediction unit has been trained for fetch groups A and B. Thus, when a fetch address from fetch group A arrives at next fetch predictor 230, next fetch predictor 230 predicts that the next fetch PC will be address A+32 and predicts a fetch end of byte 12. In the next cycle, the predicted next fetch address A+32 arrives at instruction cache 120 along with the predicted fetch width of 12; accordingly, only bytes bytes A+32 through A+43 of fetch group B are read from instruction cache 120.

Training and retraining for the embodiment of FIG. 5b may proceed as described above with reference to the embodiment of FIG. 5a, with the difference that training of fetch widths may occur even when no branch is predicted. The examples of FIGS. 5a and 5b illustrate exemplary instruction data and how fetch width prediction of such instruction data may result in power savings (i.e., reduced power consumption) when fetching relatively wide instruction fetch groups.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
predicting, by a processing unit, a fetch width that specifies a first number of bits to be retrieved from a cache line in a fetch from an instruction cache; and
fetching only the first number of bits from the cache line in response to a fetch request corresponding to the cache line;
wherein the first number of bits is less than a maximum number of bits that the instruction cache is configured to retrieve from the cache line in response to fetch requests.

2. The method of claim 1, further comprising:
predicting by the processing unit, a second fetch width that specifies a second number of bits retrieved in a second fetch from the instruction cache;
wherein the second number of bits is less than the maximum number of bits that the instruction cache is configured to retrieve from a cache line in response to fetch requests; and
wherein the first number of bits is different from the second number of bits.

3. The method of claim 1, further comprising:
predicting, by the processing unit, a new fetch width that specifies a second number of bits to be retrieved in the fetch from the cache line;
wherein the first number of bits is different from the second number of bits.

4. The method of claim 3, wherein the predicting the new fetch width is based on detecting a misprediction of a control transfer instruction.

5. The method of claim 1,
wherein the predicting further comprises predicting a next fetch address based on a received fetch request, wherein the fetch is to the next fetch address; and
wherein the fetch to the predicted next fetch address is performed during a clock cycle immediately subsequent to the received fetch request.

6. An apparatus, comprising:
a fetch prediction unit configured to:
generate a predicted direction of a control transfer instruction within a cache line;
store a fetch width value within the fetch prediction unit based on the predicted direction of the control transfer instruction, wherein the fetch width value is indicative of a number of bits to be fetched from the cache line, wherein the number of bits is less than the entirety of the cache line and is based on the location of the control transfer instruction within the cache line; and
update the stored fetch width value in response to determining that the predicted direction of the control transfer instruction was incorrect.

7. The apparatus of claim 6,
wherein, in response to determining that the predicted direction of the control transfer instruction was incorrectly predicted as a taken branch, the fetch prediction unit is configured to update the fetch width value to a new fetch width value that is indicative of a larger number of bits to be fetched upon a subsequent fetch request associated with the cache line.

8. The apparatus of claim 6,
wherein, in response to the predicted direction of the control transfer instruction being incorrectly predicted as a not-taken branch, the fetch prediction unit is configured to update the fetch width value to a new fetch width value that is indicative of a smaller number of bits to be fetched upon a subsequent fetch request associated with the cache line.

9. The apparatus of claim 6, further comprising a branch prediction unit, wherein the fetch prediction unit is configured to determine that the predicted direction of the control transfer instruction was incorrect based on a signal from the branch prediction unit.

10. The apparatus of claim 6, wherein the fetch prediction unit is configured to determine that the predicted direction of the control transfer instruction was incorrect based on execution of the control transfer instruction.

11. The apparatus of claim 6, wherein the fetch prediction unit a single-cycle predictor that is further configured to:
receive a fetch request; and
generate a predicted next fetch address and predicted fetch width for the next fetch address before the end of a clock cycle in which the fetch request is received.

12. The apparatus of claim 11, further comprising:
a second fetch prediction unit configured to generate fetch prediction information over multiple cycles;

wherein the fetch prediction unit is further configured to update a stored fetch width value based on fetch prediction information generated by the second fetch prediction unit.

13. The apparatus of claim 11, wherein the fetch prediction unit is configured to generate the predicted next fetch address based on a program counter address associated with the fetch request.

14. An apparatus, comprising:
fetch prediction circuitry configured to:
store a fetch width value that is generated based on a predicted direction of a control transfer instruction, wherein the fetch width value is indicative of a number of bits to be fetched from a cache line, wherein the number of bits is less than the entirety of the cache line and is based on the location of the control transfer instruction within the cache line;

wherein the apparatus is configured to fetch only the number of bits from the cache line in response to a fetch request corresponding to the cache line.

15. The apparatus of claim 14, further comprising:
an instruction cache that includes the cache line, wherein each cache line in the instruction cache includes information usable to determine whether there is a hit in the cache line and wherein the cache line includes a plurality of separately-accessible portions.

16. The apparatus of claim 14, wherein the fetch width value is further generated based on a the location of a start instruction in the cache line.

17. The apparatus of claim 14, wherein the apparatus is configured to update the stored fetch width value in response to determining that the predicted direction of the control transfer instruction was incorrect.

* * * * *